United States Patent [19]

Ashizaki

[11] Patent Number: 4,868,485
[45] Date of Patent: Sep. 19, 1989

[54] THREE-PHASE CURRENT OUTPUT CIRCUIT WITH TEMPERATURE COMPENSATING FUNCTION

[75] Inventor: Yoshihiro Ashizaki, Hirakata, Japan

[73] Assignee: Matsushita Electric Industrial Co., Ltd., Kadoma, Japan

[21] Appl. No.: 162,770

[22] Filed: Mar. 1, 1988

[30] Foreign Application Priority Data

Mar. 2, 1987 [JP] Japan .................................. 62-47101

[51] Int. Cl.$^4$ .............................................. G05F 3/28
[52] U.S. Cl. .................................... 323/316; 323/907; 330/256
[58] Field of Search ............... 323/312, 217, 315, 316, 323/907; 318/799, 800; 330/256, 257, 272

[56] References Cited

U.S. PATENT DOCUMENTS 4,238,738 12/1980 Komori ................................. 330/257
4,636,742 1/1987 Oritani ................................. 330/256

Primary Examiner—William H. Beha, Jr.
Attorney, Agent, or Firm—Cushman, Darby & Cushman

[57] ABSTRACT

A three-phase current output circuit for driving a three-phase brushless motor, the output circuit having a first current source and a second current source with positive temperature coefficients which are provided so as to negate a negative temperature coefficient which causes undesirable reduction of motor torque.

2 Claims, 5 Drawing Sheets

THREE-PHASE CURRENT OUTPUT CIRCUIT WITH TEMPERATURE COMPENSATING FUNCTION

FIELD OF THE INVENTION AND RELATED ART STATEMENT

1. FIELD OF THE INVENTION

This invention relates to a three-phase current output circuit for driving three-phase brushless motors widely used in factory automation, the office automation, audio visual field and the like.

2. DESCRIPTION OF THE RELATED ART

A three-phase brushless motor driven by sine-wave current is widely used for suppressing torque ripple, thereby obtaining smooth rotation. It is required that three-phase sine-wave signals composed from the motor sensors be converted into three-phase sine-wave current signals by carrying out various processing functions so as to obtain a sine-wave signal as a current command signal to a motor drive circuit. Triple differential circuits wherein three transistors are connected for differential operation, are usually used for such purpose.

Referring now to the drawings, the three-phase current output circuit of the prior art is described hereafter with respect to FIG. 1. FIG. 1 shows a circuit diagram of the three-phase current output circuit of the prior art, whereby the three-phase current output circuit is constituted by first, second and third transistors 12, 13 and 14, a first constant current source 15, fourth, fifth and sixth transistors 16, 17 and 18, a second constant current source 19 and first, second and third current mirror circuit 20, 22 and 24. To each respective base of the first, second and third transistors, the three-phase voltage signals $V_1$, $V_2$ and $V_3$ are connected, and each emitter of the first, second and third transistors are commonly connected. First current source 15 is connected to the emitters of the first, second and third transistors. To each respective base of the fourth, fifth and sixth transistors, the three-phase voltage signals $V_4$, $V_5$ and $V_6$, are connected which have phases different by 180° from the three-phase voltage signals $V_1$, $V_2$ and $V_3$, respectively. Each emitter of the fourth, fifth and sixth transistors are commonly connected. Second current source 19 is connected to the emitters of the fourth, fifth and sixth transistors.

An input side of first current mirror circuit 20 is connected to the collector of first transistor 12 and an output side of first current mirror circuit 20 is connected to the collector of fourth transistor 16 and a first output terminal 21. An input side of second current mirror circuit 22 is connected to the collector of second transistor 13 and an output side of second current mirror circuit 22 is connected to the collector of fifth transistor 17 and a second output terminal 23. An input side of third current mirror circuit 24 is connected to the collector of third transistor 14 and an output side of third current mirror circuit 24 is connected to the collector of sixth transistor 18 and a third output terminal 25.

Operation of the prior art three-phase current output circuit is described hereafter. A constant current value Ia of first current source 15 is always shown by a formula below:

$$Ia = Ia_1 + Ia_2 + Ia_3,$$

where $Ia_1$, $Ia_2$ and $Ia_3$ are the collector currents of the first, second and third transistors 12, 13 and 14, respectively. A constant current value Ib of second current source 19 is always shown by a formula below:

$$Ib = Ib_1 + Ib_2 + Ib_3,$$

where $Ib_1$, $Ib_2$ and $Ib_3$ are the collector currents of the fourth, fifth and sixth transistor 16, 17 and 18, respectively.

Three-phase sine wave voltage signal $V_1$, $V_2$ and $V_3$, which have phase differences of 120° with respect to each other are impressed on the first, second and third transistors 12, 13 and 14:

$$V_1 = A \sin(\omega t + \alpha),$$

$$V_2 = A \sin(\omega t + \alpha - 120°),$$

$$V_3 = A \sin(\omega t + \alpha - 240°),$$

where A is amplitude, $\omega$ is angular velocity, t is time and $\alpha$ is initial phase angle.

Collector currents $Ia_1$, $Ia_2$ and $Ia_3$ are approximately as follows:

$$Ia_1 = Io \sin(\omega t + \alpha) + Ia/3,$$

$$Ia_2 = Io \sin(\omega t + \alpha - 120°) + Ia/3,$$

$$Ia_3 = Io \sin(\omega t + \alpha - 240°) + Ia/3,$$

where Io is the constant current value of the constant current source. Three-phase sine wave signals $V_4$, $V_5$ and $V_6$, which have phase differences of 180° with respect to the three-phase sine wave signals $V_1$, $V_2$ and $V_3$, are impressed on the fourth, fifth and sixth transistors 16, 17 and 18 as follows:

$$V_4 = -A \sin(\omega t + \alpha),$$

$$V_5 = -A \sin(\omega t + \alpha - 120°),$$

$$V_6 = -A \sin(\omega t + \alpha - 240°).$$

collector currents $Ib_1$, $Ib_2$ and $Ib_3$ of the transistors are as follows:

$$Ib_1 = -Io \sin(\omega t + \alpha) + Ib/3,$$

$$Ib_2 = -Io \sin(\omega t + \alpha - 120°) + Ib/3,$$

$$Ib_3 = -Io \sin(\omega t + \alpha - 240°) + Ib/3,$$

When the current Ia is equal to the current Ib, a current $I_A$ output from the first output terminal 21, a current $I_B$ output from the second output terminal 23 and a current $I_C$ output from the third output terminal 25 are as follows:

$$I_A = Ia_1 - Ib_1 = 2Io \sin(\omega t + \alpha),$$

$$I_B = Ia_2 - Ib_2 = 2Io \sin(\omega t + \alpha - 120°),$$

$$I_C = Ia_3 - Ib_3 = 2Io \sin(\omega t + \alpha - 240°).$$

In the above-mentioned prior art circuit output currents $I_A$, $I_B$ and $I_C$ have a negative temperature coefficient as described below.

In the above-mentioned circuit, emitters 12E, 13E, 14E of three transistors 12, 13, 14 are commonly connected. The fundamental operation of the above-mentioned circuit is the same as a circuit where the emitters of two transistors are commonly connected as shown in FIG. 2. The circuit shown in FIG. 2 consists of two transistors $Q_1$, $Q_2$ whose emitters are commonly connected to a constant current source, and the collectors are connected to the current-mirror circuit 50. A current gain of the circuit is given as follows:

$$dIout/d(V_1-V_2)=qIo/2kT,$$

where T is temperature, q is electric charge, Iout is output current, k is Boltzman's constant and Io is the current of the constant current source. Because $dIout/d(V_1-V_2)$ is in inverse proportion to temperature, the temperature coefficient of the current gain becomes negative.

In many cases, the output currents $I_A$, $I_B$ and $I_C$ of the three-phase current output circuit is directly used as a command signal for motor current. Therefore, the negative temperatures coefficient causes reduction of motor torque at high temperature and causes undesirable temperature coefficients of total gain of servo the system.

OBJECT AND SUMMARY OF THE INVENTION

It is an object of the present invention to provide a three-phase current output circuit which does not reduce motor torque even at high temperatures by compensating the negative temperature coefficient which is essentially provided in triple the differential circuit in the three-phase output circuit.

The three-phase current output circuit of the invention comprises:

first, second and third transistors which are connected commonly at each emitter thereof and connected so as to receive three-phase voltage signals $V_1$, $V_2$ and $V_3$ at their bases, respectively, a first current source connected to each emitter of the first, second and third transistors, the first current source having a positive temperature coefficient, fourth, fifth and sixth transistors which are connected commonly at each emitter thereof and connected so as to receive three-phase voltage signals $V_4$, $V_5$ and $V_6$ at their bases, respectively, the three-phase voltage signals having a 180° phase difference against with respect to the three-phase voltage signals $V_1$, $V_2$ and $V_3$, respectively a second current source connected to each emitter of the fourth, fifth and sixth transistors, the second current source having a positive temperature coefficient the same as that of the first current source, a first current mirror circuit whose input terminal is connected to a collector of the first transistor and whose output terminal as a first output terminal is connected to a collector of the fourth transistor, a second current mirror circuit whose input terminal is connected to a collector of the second transistor and whose output terminal as a second output terminal is connected to a collector of the fifth transistor, a third current mirror circuit whose input terminal is connected to a collector of the third transistor and whose output terminal as a third output terminal is connected to a collector of the sixth transistor.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 6 is a block diagram of a driving circuit for a motor.

DESCRIPTION OF THE PREFERRED EMBODIMENTS

Figure 1:
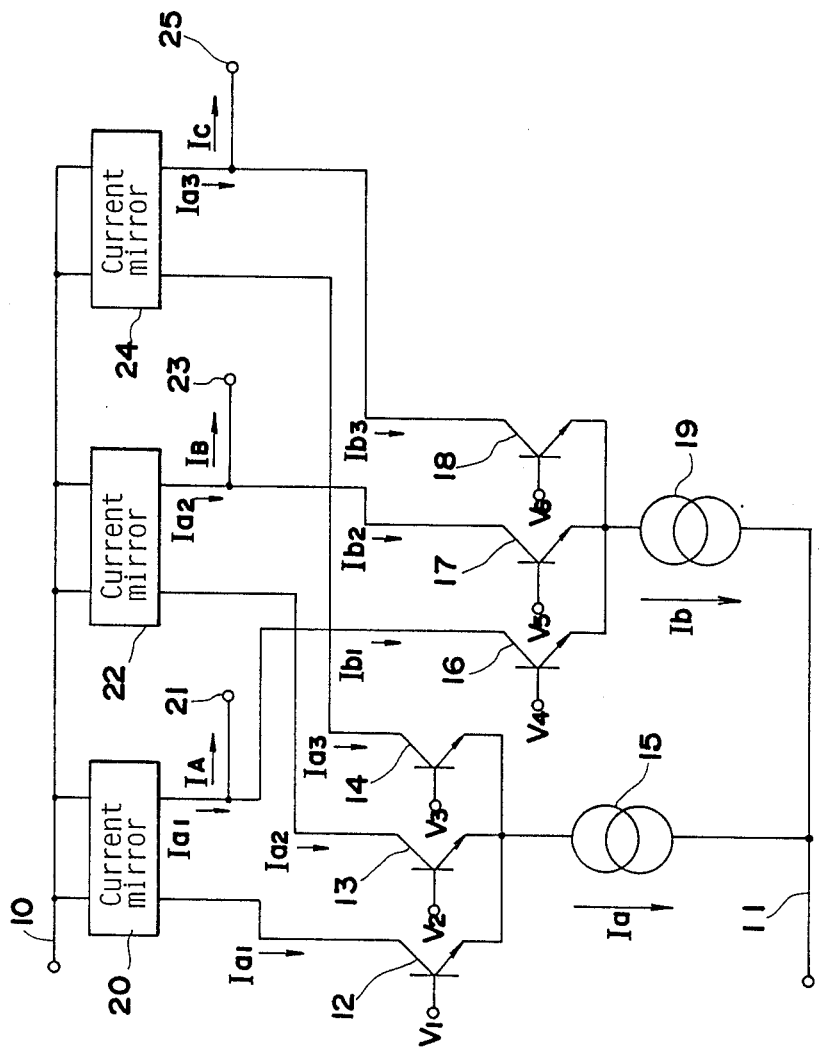
FIG. 1 is the block diagram of the three-phase current output circuit of the prior art.
Figure 2:
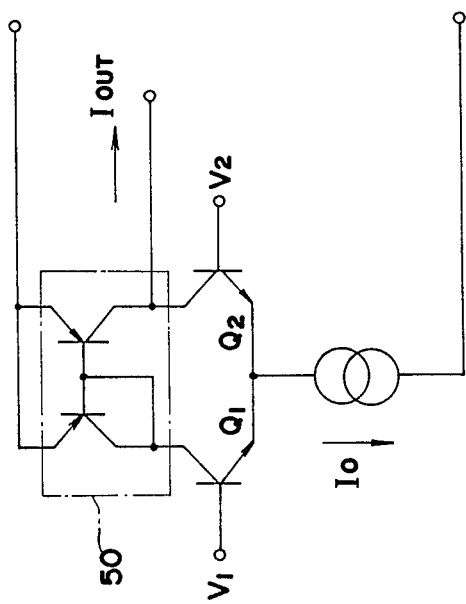
FIG. 2 is the circuit diagram of a current output type differential amplifier.

FIG. 6 shows a block diagram of a driving circuit for a motor having a three-phase current output circuit embodying the present invention. To a phase advancer 104, an excitation sensor signal from a sensor 102 for detecting the rotation state of three-phase motor 101 and a command signal from a terminal 103 are inputted. The phase advancer 104 comprises a phase shifter 105 and a three phase current output circuit 106. To the phase shifter 105, the sensor signals from the sensor 102, which are three-phase signals, are inputted. The phase shifter 105 makes three-phase signals $V_1$, $V_2$ and $V_3$ which have a phase difference with respect to the inputted three-phase signals, respectively. The phase difference is determined by the command signal from the terminal 103. Also, the phase shifter 105 output three-phase signals $V_4$, $V_5$ and $V_6$ which have phase a difference of 180° with respect to the three-phase signals $V_1$, $V_2$ and $V_3$, respectively. The phase shifted signal is inputted to the three-phase current output circuit 106. The three-phase current output circuit 106 drives the three-phase motor 101 by outputting the three-phase current through amplifier 107 in response to the command signal.

Figure 4C:
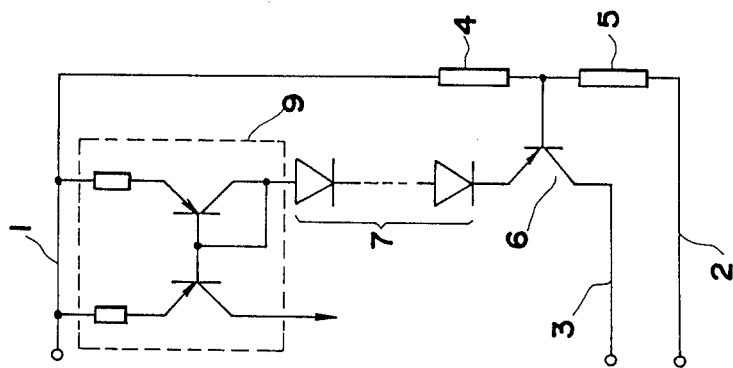
FIGS. 4(a)–(c) are circuit diagrams of the current source part of the three-phase current output circuit embodying the present invention when a PNP transistor is used.
Figure 4B:
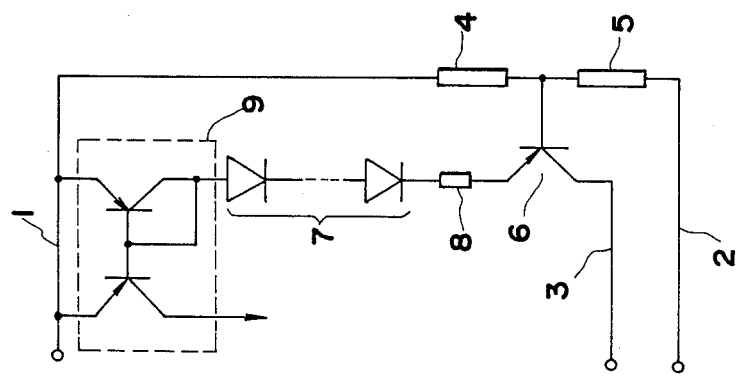
Figure 4A:
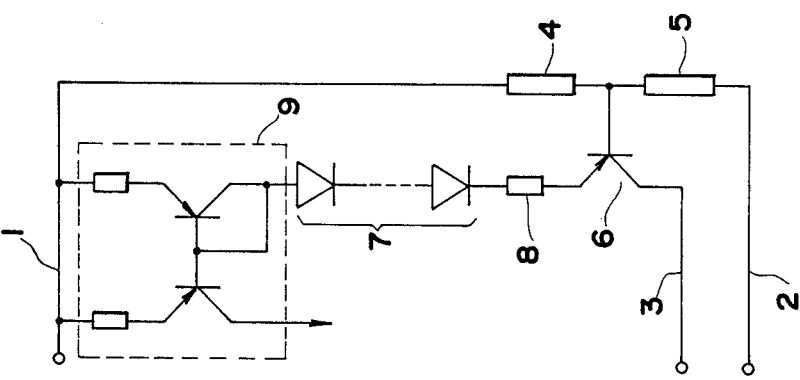
Figure 5:
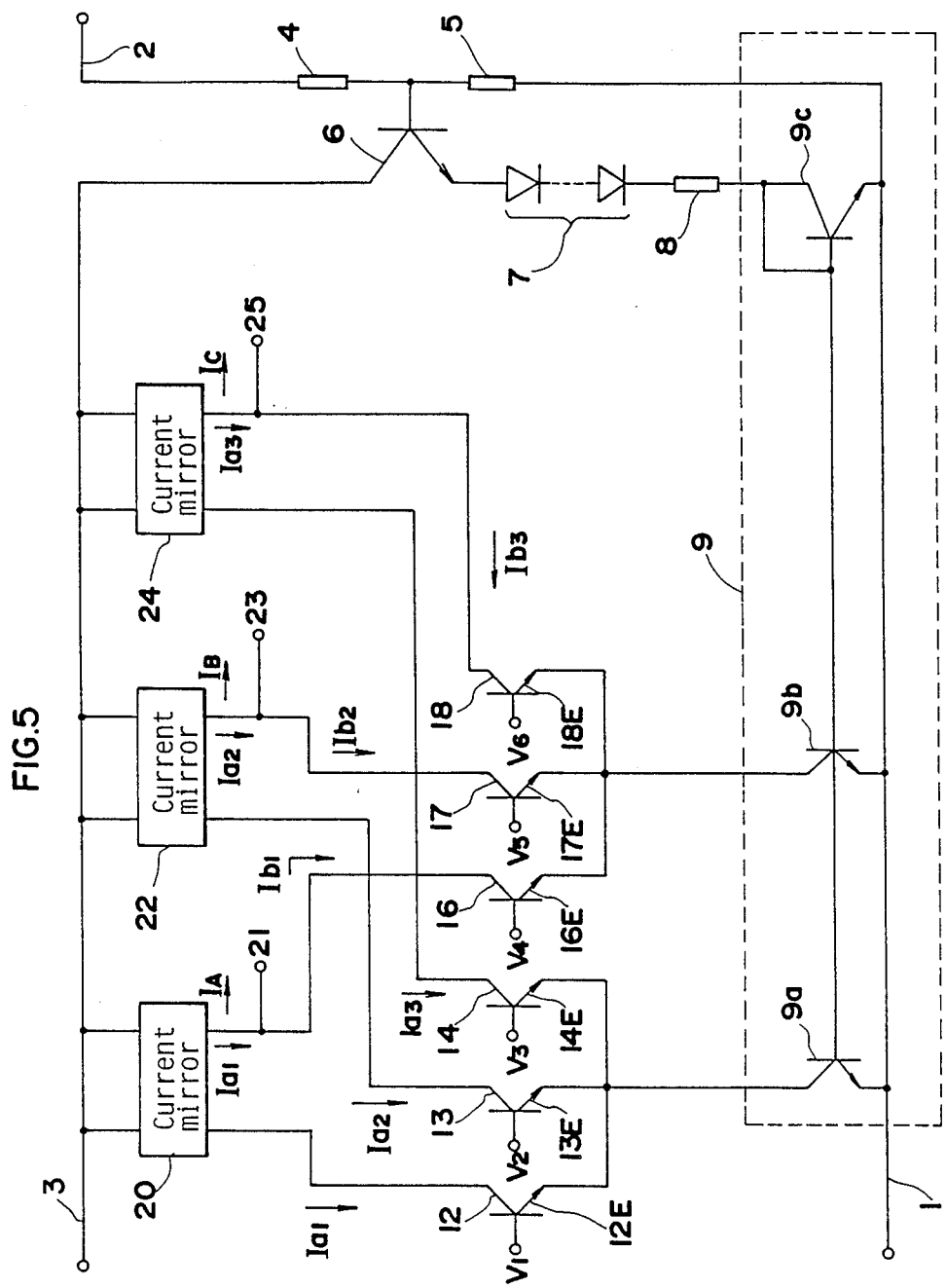
FIG. 5 is a circuit diagram of a three-phase current output circuit embodying the present invention.

Referring now to FIGS. 3–5 the structure for determining the current value of the constant current source 9 of three-phase current output circuit is described hereafter.

Figure 3C:
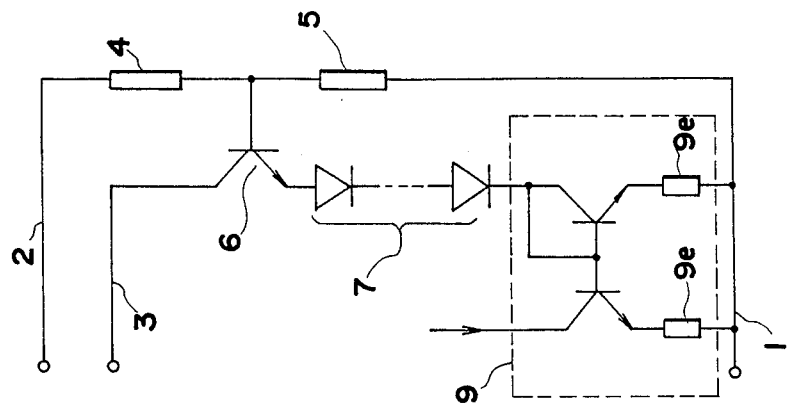
FIGS. 3 (a)–(c) are circuit diagrams of the current source part of the three-phase current output circuit embodying the present invention when an NPN transistor is used.
Figure 3B:
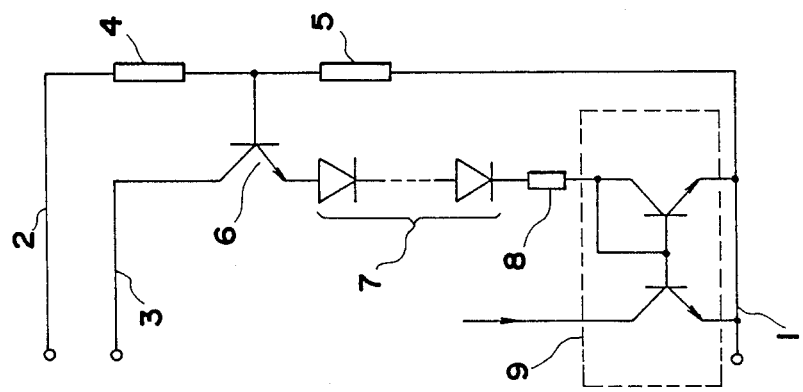
Figure 3A:
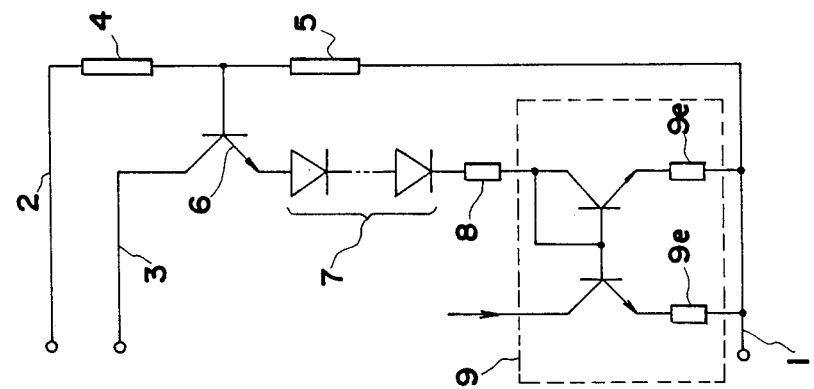

FIG. 5 shows a three-phase current output circuit using a current source having a positive temperature coefficient. FIGS. 3(a), 3(b) and 3(c) show detailed constructions of the current source of the embodiments of the present invention.

In the present invention, a first feeding line 1, a second feeding line 2 and a third feeding line 3 are provided. The third feeding line 3 may be combined with the second feeding line 2. A transistor 6 is of NPN type. A first resistor 8 is connected to plural diodes 7 in series. Transistor 9c of a current mirror circuit 9 as the constant current source is connected to the first resistor 8.

Referring now to FIG. 5, operation of the three-phase current output circuit is described hereafter. The temperature coefficient of the voltage of the second feeding line 2 with respect to that of first feeding line 1 is fed by a band-gap-referenced biasing circuit and output circuit thereof, for example. The base voltage V of transistor 6 is kept constant against a temperature change. The forward voltage drop $V_D(\times N$: where N is an integer) of diode 7, the base-emitter voltage $V_{BE}$ of transistor 6 and voltage $V_D$ of current mirror circuit 9 are produced across the line 1 and the transistor 6. The voltage $V_D$ is a forward voltage drop in the case of connecting a transistor as a diode connection and is equal to $V_{BE}$.

When the voltage across both ends of the resistor 8 is $V_R$, the resistance value of the resistor 8 is R and the current flowing there is I, and the following relationship holds:

$$V = (2V_{BE} + N \cdot V_D) + V_R = \text{(constant)}$$

$$I = V_R/R$$

the voltages $V_{BE}$ and $V_D$ have approx. $-2\text{mV}/°\text{C}$. of negative temperature coefficient and thus the voltages $V_{BE}$ and $V_D$ drop in response to a temperature rise. Because the voltage V is kept constant, the voltage $V_R$ rises. Therefore, in the circuit of FIG. 3(b), the voltage having a positive temperature coefficient is produced across both ends of the resistor 8. In the circuit of FIG. 3(a), the voltage having a positive temperature coefficient is produced across both ends of the resistor 8 and across both ends of the resistor 9e of current mirror circuit 9. In the circuit of FIG. 3(c), the voltage having a positive temperature coefficient is produced across both ends of the resistor 9e of current mirror circuit 9.

When the circuit of FIG. 5 is manufactured as an integrated circuit, there are some cases where an absolute value of the negative temperature coefficient of the three-phase current output part is not equal to an absolute value of the positive temperature coefficient of the current source circuit.

In the circuit of this embodiment, precise adjustment of the temperature coefficient can be obtained easily. The precise adjustment is carried out by controlling the base voltage of transistor 6 by varying the ratio of the resistance values of resistors 4 and 5. The operation of the precise adjustment is described below. When, for example, the base voltage of transistor 6 is dropped by varying the ratio of the resistance values of resistors 4 and 5, the voltage drops of the transistors 6, 9c and the diodes 7 are not varied. Therefore, the voltage across the resistor 8 drops. The voltage changes with respect to the temperature of the diodes 7 and transistors 6, 9c are not changed even when the base voltage of transistor 6 is dropped (the voltage across the resistor 8 is dropped). The ratio of the voltage changes against the temperature of the diodes 7 and transistor 6, 9c and the voltage across the resistor 8 becomes large by dropping the base voltage of transistor 6. Therefore, the temperature coefficient of the current flowing in the resistor 8 can be continuously varied by controlling the base voltage of transistor 6.

FIG. 3(a) is the case that the first resistance 8 and the emitter resistance of the current mirror circuit 9 are inserted between the emitter of transistor 6 and the first feeding line 1. FIG. 3(b) is the case that only the first resistance 8 is inserted. FIG. 3(c) is the case that only the emitter resistance of current mirror circuit 9 is inserted.

FIGS. 4(a), 4(b) and 4(c) show circuit diagrams of the current source part of a three-phase current output circuit which uses PNP transistors. The circuits of FIGS. 4(a), 4(b) and 4(c) differ from the circuits of FIGS. 3(a), 3(b) and 3(c) in that the current mirror circuit 9 gives the output to the diodes 7 and that the anode side of the diode 7 is connected to the current mirror circuit 9.

The first transistor 6 may be replaced by Darlington connected transistors.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A three-phase current output circuit with a temperature compensating function, comprising:

first, second and third transistors which are connected commonly at each emitter thereof and connected so as to receive three-phase voltage signals $V_1$, $V_2$ and $V_3$ at their bases, respectively;

a first current source connected to each emitter of said first, second and third transistors, the first current source having a positive temperature coefficient;

fourth, fifth and sixth transistors which are connected commonly at each emitter thereof and connected so as to receive three-phase voltage signals $V_4$, $V_5$ and $V_6$ at their bases, respectively, said three-phase voltage signals having a 180° phase difference with respect to said three-phase voltage signals $V_1$, $V_2$ and $V_3$, respectively;

a second current source connected to each emitter of said fourth, fifth and sixth transistors, the second current source having a positive temperature coefficient the same as that of said first current source;

a first current mirror circuit whose input terminal is connected to a collector of said first transistor and whose output terminal as a first output terminal is connected to a collector of said fourth transistor;

a second current mirror circuit whose input terminal is connected to a collector of said second transistor and whose output terminal as a second output terminal is connected to a collector of said fifth transistor; and a third current mirror circuit whose input terminal is connected to a collector of said third transistor and whose output terminal as a third output terminal is connected to a collector of said sixth transistor.

2. A three-phase current output circuit with a temperature compensating function, comprising:

first, second and third transistors which are connected commonly at each emitter thereof and connected so as to receive three-phase voltage signals $V_1$, $V_2$ and $V_3$ at their bases, respectively;

a first current source connected to each emitter of said first, second and third transistors, the first current source having a positive temperature coefficient;

fourth, fifth and sixth transistors which are connected commonly at each emitter thereof and connected so as to receive three-phase voltage signals $V_4$, $V_5$ and $V_6$ at their bases, respectively, said three-phase voltage signals having a 180° phase difference with respect to said three-phase voltage signals $V_1$, $V_2$ and $V_3$, respectively;

a second current source connected to each emitter of said fourth, fifth and sixth transistors, the second current source having a positive temperature coefficient the same as that of said first current source;

a first current mirror circuit whose input terminal is connected to a collector of said first transistor and whose output terminal as a first output terminal is connected to a collector of said fourth transistor;

a second current mirror circuit whose input terminal is connected to a collector of said second transistor and whose output terminal as a second output terminal is connected to a collector of said fifth transistor;

a third current mirror circuit whose input terminal is connected to a collector of said third transistor and whose output terminal as a third output terminal is connected to a collector of said sixth transistor;

at least two resistors connected in series with each other between a first feeding line and a second feeding line, said second feeding line having a zero temperature coefficient due to a voltage difference between said first and second feeding lines;

a seventh transistor having a collector connected to one of said second and a third feeding line, and a base connected to a connecting point between two of said at least two resistors;

a plurality of diodes connected in series between an emitter of said seventh transistor and said first feeding line;

a first resistor connected with said diodes in series; and an eighth transistor connected to said first resistor and forming current mirror circuits with said first and second current sources so as to determine output currents of said first and second current sources.

* * * * *